United States Patent
Mizuno et al.

(10) Patent No.: US 6,482,501 B2
(45) Date of Patent: *Nov. 19, 2002

(54) OPTICAL-USE ADHESIVE FILM

(75) Inventors: Naoki Mizuno, Ohtsu (JP); Mikio Matsuoka, Ohtsu (JP)

(73) Assignee: Toyo Boseki Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,343

(22) Filed: May 18, 1999

(65) Prior Publication Data

US 2002/0098344 A1 Jul. 25, 2002

(30) Foreign Application Priority Data

May 18, 1998 (JP) ............................................. 10-135662
Feb. 22, 1999 (JP) ............................................. 11-042851

(51) Int. Cl.$^7$ .............................. B32B 3/00; B32B 5/02; B32B 27/08; B32B 27/36; B32B 27/40
(52) U.S. Cl. ........................ 428/141; 428/323; 428/332; 428/343; 428/480; 428/910; 428/423.7
(58) Field of Search ............................... 428/40.1, 141, 428/323, 423.7, 480, 910, 332, 343

(56) References Cited

U.S. PATENT DOCUMENTS 5,912,085 A * 6/1999 Ito et al. ...................... 428/500
5,958,552 A * 9/1999 Fukuda et al. ............... 428/141

FOREIGN PATENT DOCUMENTS

| EP | 0 635 358 | 1/1995 |
| JP | 58-98709 | 6/1983 |
| JP | 59-50412 | 3/1984 |
| WO | 93/22137 | 11/1993 |
| WO | 97/11844 | 4/1997 |

OTHER PUBLICATIONS

Encyclopedia of Polymer Science and Engineering, vol. 6, pp. 603–607, Jun. 1987.*

* cited by examiner

Primary Examiner—Stevan A. Resan
Assistant Examiner—Ramsey Zacharia
(74) Attorney, Agent, or Firm—Foley & Lardner

(57) ABSTRACT

An optical-use adhesive film includes a substrate film formed of a biaxially oriented polyester film; and a polymeric adhesive layer provided on at least one surface of the substrate film. The optical-use adhesive film has a haze of 1.0% of less, and the substrate film contains foreign substance particles having a maximum size of about 20 $\mu$m or more at a ratio of about 10/m$^2$ or less.

6 Claims, 1 Drawing Sheet

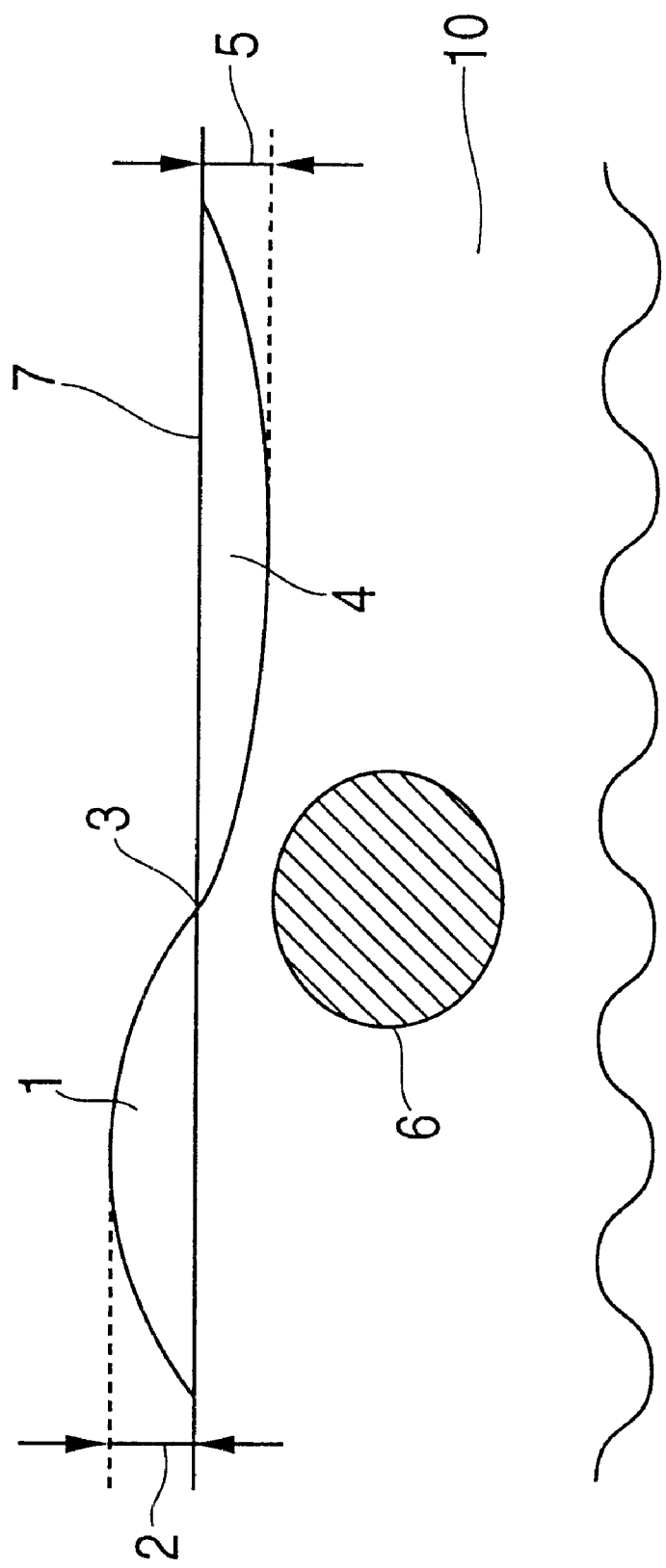

OPTICAL-USE ADHESIVE FILM

BACKGROUND OF THE INVENTION

1. Field of the Invention

The present invention relates to an optical-use adhesive film, and in particular to an adhesive film used for, for example, a base film for a prism lens sheet in an LCD, a base film for a hardcoat-processed film, a base film for an AR (anti-reflector) film or a protective film in a CRT.

2. Description of the Related Art

In general, an optical-use adhesive film includes a substrate film and an adhesive layer provided on a surface of the substrate film. The substrate film is formed of, for example, a biaxially oriented polyester film.

Biaxially oriented polyester films are in wide use as various optical-use films due to the superior transparency, size stability and anti-chemical resistance thereof.

In particular, base films for prism lens sheets used in LCDs, base films for hardcoat-processed films, base films for AR films and protective films used in CRTs are required to have a superior strength and size stability. Accordingly, films having a relatively large thickness of about 100 $\mu$m or more are preferably used for the above-mentioned optical-use films. Such optical-use films are required to have a superior transparency and also to have a superior adhesiveness suitable for prism lens processing, hardcoat processing and AR processing. It is demanded that microscopic foreign substances contained in such films are in a minimum possible amount since such foreign substances are recognized as optical defects.

It is generally known that a polyester film has an inferior adhesiveness with, for example, prism lenses or hardcoat layers formed of an acrylate or the like. In order to provide the film with a satisfactory slip and ease in handling, it is common to mix inactive particles in a polyester film to form an unevenness at a surface of the film. However, the inactive particles mixed in the polyester film deteriorate the transparency of the film and thus is undesirable when the polyester film is used for optical uses.

Presence of foreign substance particles in an optical-use polyester polymer film is undesirable for the following reasons. When a substrate film of the optical-use film is formed of the polyester polymer, the alignment of the polyester molecules is disturbed around the foreign substances. Thus, an optical distortion tends to be generated. Due to the optical distortion, the foreign substance particles are recognized as optical defects much larger than the actual size thereof, which significantly spoils the quality of the film. For example, even a foreign substance particle having a size of about 20 $\mu$m is recognized as an optical defect having a size of about 50 $\mu$m or more, and in an excessive case, 100 $\mu$m or more. It is desirable that, in order to provide a highly transparent film, the inactive particles for providing the film with a satisfactory slip are not mixed in the film or are mixed in a very small amount such that the transparency of the film is not spoiled. However, as the amount of the inactive particles is smaller and thus the transparency of the film is higher, the optical defects caused by the microscopic foreign substance particles tend to be more conspicuous. As the film is made thicker, the amount of the foreign substance particles in a unit area of the film tends to be larger, which makes more serious the problem of the optical defects.

Reducing the amount of the inactive particles mixed in the film to a very small amount or zero in order to raise the transparency of the film has another problem in that the film does not have a sufficient slip and is difficult to handle. Such an insufficient slip can be avoided by mixing slip-providing particles in an adhesive layer of the film. Such slip-providing particles need to have an average size which is smaller than the wavelength of the visible light in order to maintain the transparency of the film. However, such microscopic particles tend to aggregate together to form a rough and large aggregation. Such large aggregations in the adhesive layer are also recognized as optical defects as well as other foreign substance particles also contained in the adhesive layer.

An optical-use adhesive film needs to have a thermal shrinkage which is small and uniform in all directions. For example, an optical-use adhesive film used for touch panels is provided with a transparent conductive layer laminated on one surface thereof and a hardcoat layer laminated on the other surface thereof. The surface on which the hardcoat layer is to be laminated is, for example, annealed as post-processing. The annealing is performed at a temperature of about 130° C. to about 150° C. Unless, the thermal shrinkage of the film at about 150° C. is small and uniform in all directions, the film is significantly curled by the annealing. As a result, the film may become stuck in a drying apparatus, or may not provide a satisfactory flatness when used in a touch panel unit. A film as thick as about 100 $\mu$m or more has a slower heat transfer and thus is more satisfactory in thermal shrinkage than a thinner film. However, regardless of the thickness, a rolled film coming out from a roll mill through a slit at an end of the mill has a different angle of orientation axis from a portion of the film running at a center of the mill, due to the so-called "Bowing phenomenon". For this reason, the film tends to have an anisotropic thermal shrinkage, which results in curling.

SUMMARY OF THE INVENTION

An optical-use adhesive film according to the present invention includes a substrate film formed of a biaxially oriented polyester film; and a polymeric adhesive layer provided on at least one surface of the substrate film. The optical-use adhesive film has a haze of 1.0% or less. and the substrate film contains foreign substance particles having a maximum size of about 20 $\mu$m or more at a ratio of about 10/m$^2$ or less.

In one embodiment of the invention, the substrate film has a thickness of about 100 $\mu$m or more.

In another embodiment of the invention, the substrate film contains the foreign substance particles having a maximum size of about 20 $\mu$m or more at a ratio of about 10/m$^2$ or less in and below an area of the substrate film, the area having a protrusion having a height of about 1 $\mu$m or more and a recess bordered on the protrusion and extending a horizontal distance of up to about 100 $\mu$m from the border with the protrusion, the recess having a depth of about 0.5 $\mu$m or more. In this specification, such an area is referred to as a "lens area". For simplicity, the expression "in the lens area" refers to "in and below the lens area" unless otherwise specified.

In still another embodiment of the invention, the polymeric adhesive layer contains a polyester copolymer and a polyurethane resin.

In yet still embodiment of the invention, the polymeric adhesive layer contains slip-providing particles.

In yet still embodiment of the invention, the adhesive layer contains at least either one of rough and large aggregations and foreign substance particles having a maximum size of about 100 $\mu$m at a ratio of about 3/m$^2$ or less.

In yet still embodiment of the invention, the optical-use adhesive film has a maximum thermal shrinking ratio of about 3% or less and maximum thermal shrinking ratio/minimum thermal shrinking ratio of about 1 to about 10 after being treated at about 150° C. for about 30 minutes.

Thus, the invention described herein makes possible the advantages of providing an optical-use adhesive film which is superior in transparency, adhesiveness, thermal shrinkage, and optical defects.

These and other advantages of the present invention will become apparent to those skilled in the art upon reading and understanding the following detailed description with reference to the accompanying figures.

BRIEF DESCRIPTION OF THE DRAWINGS

The FIGURE is a view illustrating an optical defect.

DESCRIPTION OF THE EMBODIMENTS

Hereinafter, the present invention will be described by way of illustrative examples with reference to the accompanying drawing.
(Substrate film)

A biaxially oriented polyester film forming a substrate film is formed of a polyester polymer. Usable polyester polymers include, for example, polyethylene terephthalate (PET), polybutylene terephthalate (PBT), polyethylene-2,6-naththalate (PEN), and copolymers containing components of these polymers as a main component and also containing a copolymerizable component. PET is especially preferable.

When a polyester copolymer is used as the polyester polymer forming the biaxially oriented polyester film, useable copolymerizable components include, for example, the following components. Usable dicarboxylic acids include, for example, aliphatic dicarboxylic acids such as, for example, adipic acid and sebacic acid; aromatic dicarboxylic acids such as, for example, terephthalic acid, isophthalic acid, phthalic acid, and 2,6-naphthalene dicarboxylic acid; and tri- or higher polyvalent carboxylic acids such as, for example, trimellitic acid and pyromellitic acid. Usable glycols include, for example, aliphatic glycols such as, for example, ethylene glycol, diethylene glycol, 1,4-butenediol, propylene glycol, and neopentyl glycol; aromatic glycols such as, for example, p-xylene glycol; alicyclic glycols such as, for example, 1,4-cyclohexane dimethanol; and polyethylene glycol having an average molecular weight of 150 to about 20,000. When PET is used, terephthalic acid and ethylene glycol are excluded from the above-listed usable copolymerizable components. When PST is used, terephthalic acid and 1,4-butanediol are excluded from the above-listed usable copolymerizable components. When PEN is used, 2,6-naphthalene dicarboxylic acid and ethylene glycol are excluded from the above-listed usable copolymerizable components.

A polyester copolymer preferably contains a copolymerizable component in less than about 20 mol %. When a copolymerizable component is contained in about 20 mol % or more, the resultant film tends to be inferior in terms of strength, transparency and heat resistance.

The above-listed polyester polymers can contain various additives such as, for example, an antistatic agent, UV absorber, and stabilizer.

A polyester polymer pellet forming the biaxially oriented polyester film preferably has an intrinsic viscosity of about 0.45 to about 0.70 dl/g. When the intrinsic viscosity is less than about 0.45 dl/g, the anti-tear resistance of the film is not improved as desired. When the intrinsic viscosity is more than about 0.70 dl/g, an increase in the filtering pressure of the melted polymer during the film formation is too large to realize high precision filtering.

An optical-use adhesive film according to the present invention has a haze of about 1.0% or less, preferably of about 0.8% or less, and more preferably of about 0.6% or less. When the haze is more than about 1.0%, the optical-use adhesive film used as a lens film of an LCD or an AR film of a CRT tends to lower the clarity of the screen. In order to keep the haze to about 1.0% or less, it is preferable that the substrate film does not substantially contain slip-providing particles.

A biaxially oriented film is produced by drawing an undrawn film formed of the polyester polymer at a draw ratio of about 3.0 times or more and preferably about 3.5 times or more in a longitudinal direction (direction in which the film is extruded) and/or a transverse direction (direction perpendicular to the longitudinal direction) at a temperature in the range of about Tg—5° C. to about Tg+15° C. "Tg" indicates the glass transition point of the polyester.

The biaxially oriented film preferably has a thickness of about 100 μm or more to provide the needed strength and thermal stability. The upper limit of the thickness of the film is preferably about 300 μm, and more preferably about 250 μm. When the film thickness is less than about 100 μm, the rigidity of the film tends to be insufficient.

Herein, the term "foreign substance particles" refers to particles of external substances such as dust in the air which are not removed from and remain in the film. The foreign substance particles contained in the substrate film also contains particles caused by the catalyst of the polyester polymer.

Regarding the foreign substance particle, the term "maximum size" refers to the maximum diameter of the foreign substance particle when the particle is circular or elliptical, the maximum width of the particle when the particle is of an irregular shape, and the maximum length of the particle when the particle is column-like or needle-like.

Regarding the optical defect also, the term "maximum size" refers to the maximum diameter of the optical defect when the defect is circular or elliptical, the maximum width of the optical defect when the defect is of an irregular shape, and the maximum length of the optical defect when the defect is column-like or needle-like.

According to the present invention, the number of foreign substance particles having a maximum size of about 20 μm or more contained in the substrate film is about $10/m^2$ or less, and more preferably about $5/m^2$ or less. When the number of the foreign substance particles is more than $10/m^2$, the number of the above-mentioned optical defects tends to be excessive.

Briefly, the substrate film is formed by extruding melted polyester polymer (copolymer) into a sheet and then cooling the sheet of the melted polyester polymer. When the term "polyester polymer" is used, it is understood to include copolymers, in the above defined amounts and of the above-identified types, unless otherwise specified. When the melted polyester polymer contains foreign substance particles, the foreign substance particles which have passed through a filtering member in the extrusion process progressively crystallize a portion of the polyester polymer around the particles while the sheet of the melted polyester polymer is cooled, even when the particles are microscopic. The crystallized portion of the polyester polymer causes nonuniform drawing of the substrate film. The substrate film obtains a thickness difference, although very small, due to protrusions and recesses as shown in, for example. the FIGURE.

With reference to the FIGURE, a substrate film 10 has a protrusion 1 and a recess 4 bordering on the protrusion 1 along a border 3, and acts as a lens which refracts or scatters the light. The recess 4 extends a horizontal distance of up to about 100 μm from the border 3. Such an area is referred to as a "lens area", as described above. A foreign substance particle 6 in or below the lens area is recognized by the human eye as an optical defect which is much larger than the actual size thereof. The thickness difference of the lens area can be represented as the sum of a height 2 of the protrusion 1 and a depth 5 of the recess 4. When the height 2 of the protrusion 1 is about 1 μm or more and the depth 5 of the adjacent recess 2 is about 0.5 μm or more, the foreign substance particle 6 present in or below the lens area and having a maximum size of about 20 μm is recognized as an optical defect having a size of about 50 μm or more, and in an excessive case, about 100 μm or more. As described above, the expression "in the lens area" refers to "in and below the lens area" unless otherwise specified for simplicity.

According to, the present invention, the number of foreign substance particles having a maximum size of about 20 μm or more contained in the lens area of the substrate film is about $10/m^2$ or less, and more preferably about $5/m^2$ or less. When the number of the foreign substance particles is more than $10/m^2$, a desired optical-use adhesive film is not obtained.

Herein, the term "height" indicates the height from a reference line 7 calculated from the surface roughness of the substrate film 10. The term "depth" indicates the depth from the reference line 7 calculated from the surface roughness of the substrate film 10. The border 3 is on the reference line 7.

(Adhesive layer)

The optical-use adhesive film according to the present invention includes an adhesive layer laminated on one surface of the biaxially oriented polyester film acting as a substrate film. The adhesive layer is preferably laminated by an in-line coat method; i.e., the adhesive layer is provided on a surface of an undrawn or monoaxially drawn polyester film (substrate film), and then the assembly of the adhesive layer and the polyester film is drawn monoaxially or biaxially in two perpendicular directions, and thermally fixed. In the case where the adhesive layer contains microscopic particles having an appropriate size so as to have a satisfactory slip, the assembly can be wound with satisfactory ease and thereby prevented from being damaged. The substrate film need not contain slip-providing particles and thus can maintain the high transparency thereof.

In this specification, the term "adhesive layer" refers to a layer having an adhesiveness of about 85% or more, preferably of about 90% or more, and more preferably of about 95% or more with an, acrylate-based hardcoat layer. The percentage of the adhesiveness is based on the evaluation test described later.

The adhesive layer of the optical-use adhesive film according to the present invention preferably contains a polyester copolymer and a polyurethane resin as main resin components. When the adhesive layer contains a polyester copolymer but not a polyurethane resin, the adhesive layer has a sufficient adhesiveness with the substrate film formed of a polyester polymer but tends to have an inferior adhesiveness when an acrylate-based resin is used for the prism lens or hardcoat layer. When the adhesive layer contains a polyurethane resin but not a polyester copolymer, the adhesive layer has a sufficient adhesiveness with an acrylate-based resin but tends to have an inferior adhesiveness when the substrate film is formed of a polyester polymer.

The polyester copolymers usable for the adhesive layer preferably contain a dicarboxylic acid and a glycol including a branched glycol. The branched glycols include, for example, 2,2-dimethyl-1,3-propanediol, 2-methyl-2-ethyl-1,3-propanediol, 2-methyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 2,2-di-n-butyl-1,3-propanediol, 2-n-butyl-2-propyl-1,3-propanediol, and 2,2-di-n-hexyl-1,3-propanediol.

The above-listed glycols are preferably contained in the glycol at a ratio of about 10 mol % or more, and more preferably at a ratio of about 20 mol % or more. As a glycol other than the branched glycols, ethylene glycol is most preferable. Diethylene glycol, propylene glycol, butanediol, hexanediol or 1,4-cyclohexane dimethanol or the like can be used in a small amount.

As a dicarboxylic acid contained in the polyester copolymer, terephthalic acid and isophthalic acid are most preferable. Other dicarboxylic acids, particularly aromatic dicarboxylic acid such as, for example, diphenyl dicarboxylic acid and 2,6-naphthalene dicarboxylic acid can be added in a small amount to terephthalic acid and isophthalic acid for copolymerization. The polyester copolymer preferably contains 5-sulfoisophthalic acid or a salt thereof in a range of about 1 to about 10 mol % in order to obtain aqueous dispersability. Alternatively, for example, sulfoterephthalic acid, 5-sulfoisophthalic acid, 4-sulfonaphthalene-2,7-dicarboxylic acid and 5-(4-sulfophenoxy)isophthalic acid and a salt thereof can be used.

As a polyurethane resin used for the adhesive layer, for example, a resin containing a blocked isocyanate group is preferable. This is, for example, a thermally reactive water-soluble urethane in which a terminal isocyanate group is blocked by a blocking agent containing a hydrophilic group. Usable blocking agents include, for example, bisulfite, phenols containing a sulfonate group, alcohols, lactams, oximes, and active methylene compounds. The blocked isocyanate group makes the urethane prepolymer hydrophilic or water-soluble. When the resin containing the blocked isocyanate group is provided with thermal energy during the drying or thermosetting process of the film formation, the blocking agent is dissociated from the isocyanate group. Accordingly, the resin fixes the polyester copolymer which is mixed in the meshes produced by self-crosslinking and also reacts with a terminal group of the polyester copolymer or the like. The resin containing the blocked isocyanate group does not have a sufficient anti-water resistance during the preparation of the coating liquid, but upon the completion of the reaction as a result of application, drying and thermosetting, the hydrophilic group of the resin, i.e., the blocking agent, is dissociated. Thus, a highly water-resistant layer is applied.

Among the above-listed blocking agents, bisulfite, which has an appropriate heat treatment temperature and time period, is preferred for industrial use.

An urethane prepolymer used for the polyurethane resin is a compound having a terminal isocyanate group obtained by reacting (1) an organic polyisocyanate having two or more active hydrogen atoms in a molecule, or a polyisocyanate compound having two or more active hydrogen atoms in a molecule, and having a molecular weight of about 200 to about 20,000, (2) polyisocyanate having two or more isocyanate groups in a molecule, and (3) a chain extending agent having at least two active hydrogen atoms in a molecule.

Generally known as the compounds in (1) are compounds containing two or more hydroxyl groups, carboxyl groups, amino groups or mercapto groups at a terminal position or in a molecule. Particularly preferable compounds include, for example, polyether polyols, polyester polyols, and polyether ester polyols.

Usable polyether polyols include, for example, alkylene oxides such as, for example, ethylene oxide and propylene oxide; compounds obtained by polymerizing styrene oxide, epichlorohydrin and the like; and compounds obtained by random polymerization, block polymerization or addition polymerization to polyvalent alcohols thereof.

Polyester polyols and polyether ester polyols mainly include straight-chain or branched compounds. Polyester polyols and polyether ester polyols can be obtained by condensing (a) a polyvalent saturated or unsaturated carboxylic acid such as succinic acid, adipic acid, phthalic acid, maleic anhydride or the like, or an anhydride of such a carboxylic acid and (b) a polyvalent saturated or unsaturated alcohol such as ethylene glycol, diethylene glycol, 1,4-butanediol, neopentyl glycol, 1,6-hexanediol or trimethylolpropane, and (c) a polyalkylene ether glycol having a relatively small molecular weight such as polyethylene glycol, polypropylene glycol or the like, or a mixture thereof.

Usable polyester polyols further include, for example, polyesters obtained from lactone or hydroxy acid. Usable polyether ester polyols further include, for example, polyether esters obtained by adding ethylene oxide or propylene oxide to pre-produced polyesters.

Usable organic polyisocyanates (2) include, for example, isomers of toluylene diisocyanate; aromatic diisocyanates such as, for example, 4,4-diphenylmethane diisocyanate; aralkyl diisocyanates such as, for example, xylylene diisocyanate; alicyclic diisocyanates such as, for example, isophorone diisocyanate and 4,4-dicyclohexylmethane diisocyanate, aliphatic diisocyanates such as, for example, hexamethylene diisocyanate and 2,2,4-trimethylhexamethylene diisodianate; and polyisocyanates obtained by reacting one or more of these compounds and trimethylolpropane or the like.

Usable chain extending agents (3) having at least two active hydrogen atoms in a molecule include, for example, glycols such as, for example, ethylene glycol, diethylene glycol, 1,4-butanediol, and 1,6-hexanediol; tri- or higher polyol alcohols such as, for example, glycerin, trimethylolpropane, and pentaerythritol; diamines such as, for example, ethylenediamine, hexamethylenediamine, and piperazine; aminoalcohols such as, for example, monoethanolamine and diethanolamine thiodiglycols such as, for example, thiodiethylene glycol; and water.

The urethane prepolymer is produced by a one-stage or multiple-stage isocyanate polyaddition method using the above-mentioned chain extending agent at a temperature of about 70° C. to about 120° C. for about 5 minutes to several hours. The ratio of the isocyanate groups with respect to the active hydrogen atoms can be anything of one or more, as long as the resultant urethane prepolymer contains free isocyanate groups remaining therein. The content of the free isocyanate groups can be about 10% by weight or less, but is preferably about 7% by weight or less in consideration of the stability of the aqueous solution of post-blocked urethane polymer.

The urethane prepolymer is blocked preferably using bisulfite. Specifically, the urethane prepolymer and an aqueous solution of bisulfite are mixed and reacted while actively stirring for about 5 minutes to about 1 hour. The reaction temperature is preferably about 60° C. or less. Then, the resultant mixture is diluted with water to an appropriate concentration. Thus, a thermally reactive water-soluble urethane composition is obtained. The composition is adjusted to have an appropriate concentration and viscosity when put to use. In general, when the composition is heated to about 80° C. to about 200° C., the bisulfite as the blocking agent is dissociated, and thus the active isocyanate group is reproduced. Therefore, the resultant resin including the isocyanate group has the properties of producing a polyurethane polymer by intermolecular or intramolecular polyaddition reaction of the prepolymer or by reacting with other functional groups.

One representative example of the polyurethane resin including a blocked isocyanate group is Elastron (trade name; Dai-ichi Kogyo Seiyaku Co., Ltd.) Elastron is obtained by blocking the isocyanate group with sodium bisulfite. Elastron is water-soluble due to the presence of a carbamoyl sulfonate group having a strong hydrophilicity at a terminal of the molecule.

When the polyester copolymer containing a branched glycol and a polyurethane resin are mixed to prepare an aqueous coating liquid, the ratio of the copolymer:resin is preferably about 90:10 to about 10:90, and more preferably about 80:20 to about 20:80. When the ratio of the copolymer with respect to the total solid weight is less than about 10%, the applicability of the liquid to the substrate film tends to be insufficient, resulting in insufficient adhesiveness between the obtained adhesive film and the substrate film. When the ratio of the resin with respect to the total solid weight is less than about 10%, a practical adhesiveness to the UV-curing hardcoat layer tends not to be obtained.

The aqueous coating liquid can contain a catalyst in order to promote a thermal crosslinking reaction. Usable catalysts include, for example, various chemical substances including inorganic substances, salts, organic substances, alkaline substances, acid substances and metal-containing organic compounds. Alkaline substances or acid substances can be added in order to adjust the pH of the liquid.

The aqueous coating liquid can be applied to the substrate film using a required amount of known anionic or nonionic surfactant in order to increase the wettability of the substrate film and apply the liquid uniformly. As a solvent for the aqueous coating liquid, water is used. Alternatively, alcohols such as, for example, ethanol, isopropyl alcohol and benzyl alcohol can be mixed at a ratio of less than about 50% by weight with respect to the total amount of the liquid organic solvents other than alcohols can also be mixed in a soluble amount but less than about 10% by weight. The total amount of the alcohols and other organic solvents with respect to the coating liquid should be less than about 50% by weight.

When the amount of the organic solvents in the coating liquid is about 10% or more and less than about 50% by weight, the coating liquid is dried more rapidly and the coating layer appears better compared to the case when only water is used. When the amount of the organic solvents in the coating liquid is about 50% by weight or more, the vaporization speed of the solvent is too rapid and thus the concentration of the coating liquid changes during application. As a result, the viscosity is raised, and thus the applicability is reduced. Accordingly, the appearance of the coating layer may be deteriorated. There is also an undesirable possibility that a fire may be caused by the organic solvents.

As described above, since the substrate film does not substantially contain slip-providing particles, the adhesive layer preferably contains appropriate slip-providing particles to form an appropriate unevenness at a surface of the adhesive layer, so that the anti-scratch resistance and ease of handling (e.g., slip, ease of winding, blocking prevention) of the optical-use adhesive film are improved.

Materials of particles which can be contained in the adhesive layer include, for example, inorganic substances such as, for example, carbonate, calciumphosphate, silica, kaolin, talc, titanium dioxide, alumina, barium sulfate, calcium fluoride, lithium fluoride, zeolite. and molybdenum sulfide; and organic substances such as, for example, crosslinking polymers and calcium oxalate. Among these substances, silica has a relatively close refractive index to polyester and thus is most preferable in order to produce a highly transparent adhesive film.

The average diameter of the particles contained in the adhesive layer is preferably about 0.01 to about 1.0 μm, more preferably about 0.02 to about 0.5 μm, and particularly preferably about 0.03 to about 0.3 μm. When the average diameter of the particles is more than about 1.0 μm, the surface of the adhesive layer is roughened and thus the transparency of the adhesive film tends to be lowered. When the average diameter of the particles is less than about 0.01 μm, the ease of handling (e.g., slip, ease of winding, blocking prevention) of the optical-use adhesive film tends to be reduced. The content of the particles with respect to the solid amount is about 0.1% to about 60% by weight, preferably about 0.5 to 50% by weight, and more preferably about 1.0% to about 40% by weight. When the content of the particles in the adhesive layer is more than about 60% by weight, the adhesiveness of the adhesive film tends to be spoiled and the transparency also tends to be reduced. When the content of the particles in the adhesive layer is less than about 0.1% by weight, the ease of handling (e.g., slip, ease of winding, blocking prevention) of the optical-use adhesive tends to be reduced.

The adhesive layer can contain particles of two or more different materials listed above. Different sized particles of the same material can also be contained. In any case, it is preferable that the average particle diameter and the total content of the particles are both in the above-described range. When the coating liquid is applied to form the adhesive layer, the coating liquid is precision-filtered immediately before the application in order to remove rough and large particle aggregations from the liquid. The filtering member needs to be appropriately located.

The number of rough and large aggregations and foreign substance particles having a maximum size of about 100 μm or more which are present at or below a surface of the adhesive layer is about 3/m² or less; and preferably about 1/m² or less. When the number of such rough and large aggregations and foreign substance particles is more than about 3/m², the optical defects tend to be excessive. For simplicity, the aggregations and foreign substance particles present at and below a surface of the adhesive layer will be expressed as being contained "in" the adhesive layer.

Regarding the rough and large aggregations and foreign substrate particles in the adhesive layer, as in the case of the foreign substance particles in the substrate layer and optical defects, the term "maximum size" indicates the maximum diameter of thus rough and large aggregation or foreign substrate particle when it is circular or elliptical, the maximum width of the aggregation or foreign substrate particle when it is of an irregular shape, and the maximum length of the aggregation or foreign substrate particle when it is column-like or needle-like.

The filtering member for precision-filtering the coating liquid needs to allow particles of sizes of about 25 μm or less to pass (initial filtering efficiency; about 95%). When the filtering member allows particles of sizes of more than about 25 μm to pass therethrough, rough and large aggregations and foreign substrate particles are not sufficiently removed. The rough and large aggregations and foreign substrate particles which cannot be removed by filtering are expanded by the drawing stress generated by the monoaxial or biaxial drawing performed after the coating liquid is dried and are recognized as foreign substances having a size of about 100 μm or larger. This tends to cause optical defects.

As a filtering member for precision-filtering the coating liquid, any type of member can be usable as long as having the above-described performance. For example, filament-type, felt-type and mesh-type materials are usable.

For the filtering member, any material which has the above-described performance and does not have adverse effect on the coating liquid can be used. For example, stainless steel, polyethylene, polypropylene or nylon can be used The aqueous coating liquid can contain various additives such as, for example, an antistatic agent, UV absorber, plasticizer, pigment, and lubricant, as long as the adhesiveness of the layer is not spoiled. Since the coating liquid is aqueous, other water-soluble resins, water-dispersible resins and emulsions can be added to the coating liquid in order to enhance the performance as long as the adhesiveness of the layer is not spoiled.

(Optical adhesive film)

After an optical-use adhesive film according to the present invention is treated at about 150° C. for about 30 minutes, the maximum thermal shrinking ratio of the optical-use adhesive film is about 3% or less, preferably is about 2% or less, and more preferably is about 1.5% or less after the film is treated. The maximum thermal shrinking ratio/minimum thermal shrinking ratio of the adhesive film is about 1 to about 10, preferably is about 1 to about 5, and more preferably is about 1 to about 2.

After the adhesive film is treated at about 150° C. for about 30 minutes in the longitudinal direction, transverse direction, in a direction at 45 degrees with respect to the transverse direction and in a direction at 135 degrees with respect to the transverse direction, the maximum thermal shrinking ratio in each of the directions is about 3% or less, preferably is about 2% or less, and more preferably is about 1.5% or less. The maximum thermal shrinking ratio/minimum thermal shrinking ratio of the optical-use adhesive film is about 1 to about 10, preferably is about 1 to about 5, and more preferably is about 1 to about 2.

In order to obtain the maximum thermal shrinking ratio in the above-described range, the adhesive film is preferably fixed at a highest fixing temperature of about 230° C. to about 240° C. and relaxed at about 1% to about 5% in the transverse direction at a temperature about 5° C. to about 15° C. lower than the highest fixing temperature.

In order to obtain the maximum thermal shrinking ratio/minimum thermal shrinking ratio of about 1 to about 10, the draw ratio, draw speed and relaxing treatment are set in a balanced manner between the longitudinal and transverse directions. Alternatively, the optical-use adhesive film is biaxially drawn, then cooled at a temperature equal to or lower than the transverse draw temperature by a cooling zone having length L fulfilling the following expression, and thermally fixed.

$$L/W \geq 1.0$$

In the above expression, letter L indicates the length of the cooling zone for cooling the optical-use adhesive film (unit: meter), and letter W indicates the width of the optical-use adhesive film produced (unit: meter)

A method for producing an optical-use adhesive film according to the present invention will be described. In the following description, the substrate film is formed of PET, but the present invention is not limited to this.

A pellet of PET which does not substantially contain slip-providing particles is fully vacuum-dried and supplied to an extruder. The melted PET is extruded into a sheet at about 280° C. and cooled and solidified, thereby forming an undrawn PET sheet. During this process, at an arbitrary point where the melted polyester polymer is kept at about 280° C., high precision filtering is performed in order to remove foreign substance particles contained in the polyester polymer. The material for the filtering member used for the high precision filtering of the melted polyester polymer is not specifically limited. Stainless steel, which has a superior removing ability of such aggregations mainly containing Si, Ti, Sb, Ge and Cu and organic substances having a high melting point, is preferable.

The maximum size of the particles allowed to pass through the filtering member is preferably about 15 μm (initial filtering efficiency: about 95%). When the filtering member allows particles of sizes of more than about 15 μm, foreign substance particles having a size of about 20 μm are not sufficiently removed. Such a high precision filtering may undesirably lower the productivity, but is indispensable to obtain an optical-use film having no problem of optical defects.

As described above, the foreign substance particles which pass through the filtering member in the extrusion process of the melted polyester polymer progressively crystallize a portion of the polyester polymer around the particles during the cooling process of the sheet of the melted polyester polymer even when the particles are microscopic. The crystallized polyester polymer causes nonuniform drawing of the film and thus causes optical defects. Since surface of a thicker film is more difficult to rapidly cool than a surface of a thinner film and promotes crystallization and thus nonuniform drawing, it is effective to cool an air surface (surface opposed to the surface in contact with a cooling drum) of the sheet-like film using high-speed air flow.

The melted polyester polymer can be cooled by a known method; i.e., the melted polyester is extruded onto a rotating cooling drum as a sheet from a die and rapidly cooled while being in close contact with the drum. The air surface of the sheet can be cooled by known methods. For example, the air surface may be put into contact with a cooling liquid in the bath; a liquid may be sprayed through a nozzle onto the air surface; or a high-speed air flow may be blown onto the air surface. These methods can be used in combination. The sheet-like melted polyester polymer can be put into close contact with the drum by, for example, an air knife or casting of electrostatic charges. The casting of electrostatic charges, which does not cause significant thickness difference in the sheet, is preferable.

The resultant undrawn sheet is drawn at a draw ratio of about 2.5 to about 5.0 times in the longitudinal direction by a roll heated to about 80° C. to about 120° C., thereby obtaining a monoaxially drawn PET film. Then, the film held by a clip at an end thereof and guided to a hot air zone heated to about 80° C. to about 180° C., where the film is dried and then drawn at a draw ratio of about 2.5 to about 5.0 times in the transverse detection. The film is further guided to a hot air zone heated to about 160° C. to about 240° C., where the film is heat-treated for about 1 to about 60 seconds. Thus, crystal alignment is completed. Optionally, the film can be relaxed at about 1% to about 12% in the transverse or longitudinal direction during the heat-treatment process.

At any point after the undrawn PET sheet is obtained, an aqueous coating liquid containing polyester copolymer and polyurethane resin is applied to one of the surfaces of the polyester polymer film.

The aqueous coating liquid can be applied by any of known methods such as, for example, reverse roll coating, gravure coating, kiss roll coating, roll brushing, spray coating, air knife coating, wire bar coating, pipe doctor coating, impregnation coating, and curtain coating. One of the methods can be used, or two or more methods can be used in combination.

The aqueous coating liquid can be applied, as usually done, to a substrate film which has been biaxially drawn and fixed, but in-line coating, i.e., applying the liquid during the formation of the substrate film is preferable. More preferably, the liquid is applied to the substrate film before the crystal alignment is completed. The concentration of the solid content in the aqueous coating liquid is preferably about 30% by weight or less, and more preferably about 10% by weight or less. The amount of the aqueous coating liquid (weight of the solid content per unit area of the film) is preferably about 0.04 to about 5 $g/m^2$, and more preferably about 0.2 to about 4 $g/m^2$. For example, an adhesive film obtained by applying the aqueous coating liquid to the substrate film after the substrate film is drawn in the longitudinal direction is guided to a tenter, where the film is drawn transversely and thermally fixed. Due to a thermal crosslinking reaction, the resultant adhesive layer is stable. In this manner, the optical-use adhesive film including air adhesive layer is formed. In order that the optical-use adhesive film has a satisfactory adhesiveness to a hardcoat layer or the like which is to be laminated on the optical-use adhesive film, the aqueous coating liquid needs to be applied in an amount of about 0.04 $g/m^2$ and heated at about 100° C. for about 1 minute or more.

The amount of foreign substance particles existing in the adhesive layer, which is one cause of the optical defects, can be effectively reduced by maintaining the cleanliness in the air (number of particles having a size of 0.5 μm or more per cubic foot) from the formation of the undrawn PET sheet to the application of the coating liquid to about 100,000 or less, preferably about 10,000 or less.

The resultant optical-use adhesive film has superiority in terms of transparency, adhesiveness, thermal shrinkage and optical defects. Such a film is preferably usable for a base film for a prism lens sheet in an LCD, a base film for a hardcoat-processed film, a base film for an AR (anti-reflection) film or a protective film in a CRT.

EXAMPLES

Hereinafter, the present invention will be described by way of specific, but non-limiting examples. In the examples, the term "parts" refers to "parts by weight".

<Evaluation methods>

Evaluation parameters and methods for measuring the evaluation parameters used for each of optical-use adhesive films produced in examples according to the present invention and comparative examples described below will be explained.

(1) Adhesiveness between the adhesive film and an acrylate-based coating layer

An acrylate-based hardcoat agent (Seika Beam EXF01 (B), Dainichiseika Color & Chemical Mfg., Co., Ltd.) is applied to a surface of an adhesive layer of each optical-use adhesive film using a #8 wire bar, and dried at about 70° C. for about 1 minute to remove the solvent. Then, the film is irradiated by a high-pressure mercury lamp at about 200 mJ/cm² at an irradiation distance of about 15 cm at a running speed of the film of about 5 m/min., thereby forming a hardcoat layer having a thickness of about 3 μm. The adhesiveness between the adhesive film and the acrylate-based coating layer is determined by a test method conforming to JIS-K5400, 8.5.1. Specifically, cutting lines are made into the film coated with the hardcoat layer by a cutter, so that 2 mm×2 mm squares are arranged in a matrix of 10×10. The cutting lines are made sufficiently deep to reach the substrate film through the adhesive layer. A cellophane tape (No. 405, NICHIBAN Co., Ltd.; width: 24 mm) is put on the film having the cutting lines and caused to strongly adhere to the film by rubbing the tape with an eraser. Then, the tape is peeled off vertically. An area of the hardcoat layer remaining on the adhesive layer is visually observed, and the adhesiveness is obtained based on the following expression.

Adhesiveness (%)=(1-area of the peeled-off hardcoat layer/evaluation area (400 mm²))×100

(2) Detection of optical defects

Optical defects recognized to have a size of about 50 μm or more by the effect of the above-described lens area are detected in the following manner in 16 films having a size of about 250 mm×250 mm. As described above, the term "maximum size" indicates the maximum diameter of the optical defect when the defect is circular or elliptical, the maximum width of the optical defect when the defect is of an irregular shape, and the maximum length of the optical defect when the defect is column-like or needle-like.

As a light emitter, two 20 W fluorescent lamps covered with a mask having slits having a width of about 10 mm is used. As a light receiver, a CCD image sensor camera is used. A film to be measured is put horizontally on an XY table or the like. The light emitter is located about 400 mm below the film. The light receiver is located about 500 mm above the film on an extension of the straight line connecting the light emitter and the film. Then, the light emitter is moved so that the straight line connecting the light emitter and the light receiver makes an angle of 12 degrees with a direction vertical to the surface of the film. In this state, portions in the film which twinkle are detected. The light receiver converts the amount of the light from the twinkling portions into an electric signal. The electric signal is amplified and differentiated. The resultant value is compared with a threshold level by a comparator. An image of the twinkling portions obtained by the CCD image sensor camera is processed, so that the size of each twinkling portion is measured, and the position of each twinkling portion having the measured size is found.

(3) Number of optical defects caused by the foreign substance particles in the substrate film, and number of optical defects caused by the rough and large aggregations and the foreign substance particles in the adhesive layer Among the twinkling portions detected above, the optical defects which are caused by the foreign substance particles in the substrate film, and by the rough and large aggregations and the foreign substance particles in the adhesive layer are visually selected. Portions of the optical-use adhesive film including the optical defects are cut into an appropriate size and observed in a direction vertical to the surface of the film using a scaled microscope. The maximum size of each foreign substance particle in the substrate film, and the maximum size of each rough and large aggregation and foreign substance particle in the adhesive layer are measured.

Regarding the optical defects caused by the foreign substance particles in the substrate film, the number of particles having the maximum size of 20 μm or more (number/m²) is determined. Regarding the optical defects caused by the rough and large aggregations and foreign substance particles in the adhesive layer, the number of the aggregations and foreign substance particles having the maximum size of 100 μm or more (number/m²) is determined.

(4) Number of optical defects caused by the foreign substance particles in the lens area of the substrate film The optical defects are selected in the same manner as described above. Portions of the optical-use adhesive film including the selected optical defects are cut into an appropriate size. Aluminum is vapor-deposited on the film portions, and the height, depth, and horizontal size of the recess of the unevenness at the surface of the film portions when observed in a direction vertical to the film surface is measured using a non-contact three-dimensional surface roughness meter (Model 550, Micromap Corporation).

The number of optical defects having the maximum size of 20 μm or more (number/m²) recognized in a lens area is determined. As described above, the lens area refers to an area having a protrusion having a height of about 1 μm or more and a recess bordered on the protrusion and extending with a horizontal distance of up to about 100 μm from the border with the protrusion, the recess having a depth of about 0.5 μm or more. As described above, the number of foreign substrate particles in the lens area refers to the number of foreign substrate particles in and below the lens area.

(5) Haze

The haze of the film is measured using a hazemeter (Model TC-H3DP, TOKYO DENSYOKU Co., Ltd.) in conformity to JIS-K7105.

(6) Maximum thermal shrinking ratio, and maximum thermal shrinking ratio/minimum thermal shrinking ratio at 150° C.

A square portion of the film having a size of about 100 mm×100 mm is cut out. An intersection of two diagonal lines of the square is marked, and a circle around the intersection having a diameter of about 50 mm is marked. The film is shrunk by being left for about 30 minutes in a hot air drier heated to about 150° C. with no load and then taken out from the drier. The maximum and minimum diameters of the circle running through the intersection are read. The maximum thermal shrinking ratio at 150° C. is obtained from expression (1), the minimum thermal shrinking ratio at 150° C. is obtained from expression (1), and the maximum thermal shrinking ratio/minimum thermal shrinking ratio at 150° C. is obtained from expression (3). In the expressions (1), (2) and (3), "(C)" refers to the minimum diameter, and "(D)" refers to the maximum diameter.

Maximum thermal shrinking ratio=[(50−D)/50]×100  (1)

Minimum thermal shrinking ratio=[(50−C)/50]×100  (2)

maximum thermal shrinking ratio/minimum thermal shrinking ratio=(50−D)/(50−C)  (3)

(7) Molecular weight

The number average molecular weight of the polyester copolymer is measured on the basis of the molecular weight of polystyrene using gel permeation chromatography (GPC).

(8) Softening point

Ten milligrams of the polyester copolymer is held between a slide glass and a cover glass on a heat stage of a microscope and observed while heating the polymer. The temperature at which the polymer starts flowing is set as the softening point.

Example 1

(1) Preparation of the coating liquid

A coating liquid in Example 1 was prepared in the following manner.

Ninety-five parts of dimethyl terephthalate, 95 parts of dimethyl isophthalate, 35 parts of ethylene glycol, 145 parts of neopentyl glycol, 0.1 parts of zinc acetate, and 0.1 parts of antimony trioxide were put into a reaction container, so that ester interchange was caused to proceed at about 180° C. over about 3 hours. Next, 6.0 parts of 5-sodium sulfoisophthalate was added, so that ester interchange was caused to proceed at about 240° C. over about 1 hour. Then, polycondensation was caused to proceed at about 250° C. under low pressure (10 to 0.2 mmHg) over about 2 hours. As a result, a polyester copolymer having a molecular weight of about 19,500 and a softening point of about 60° C. was prepared.

Then, 6.7 parts of a 30% aqueous dispersion liquid of the resultant polyester copolymer, 40 parts of a 20% aqueous solution of a self-crosslinking polyurethane resin containing an isocyanate group blocked with sodium bisulfite (Elastron H-3(trade name). Dai-ichi Kogyo Seiyaku Co., Ltd.). 0.5 parts of an organic tin compound as a catalyst for Elastron (Cat 64 (trade name), Dai-ichi Kogyo Seiyaku Co., Ltd.), 47.8 parts of water, and 5 parts of isopropyl alcohol were mixed. Then, an anion surfactant in an amount of 1% by weight and silica as a slipping agent (Snowtex OL, Nissan Chemical Industries, Ltd.) in an amount of 5% by weight were added.

(2) Formation of an adhesive film

As a polyester polymer, a PET pellet which does not substantially contain slip-providing particles was used. The PET had an intrinsic viscosity of 0.62 dl/g. The PET pellet was dried at 135° C. for 6 hours at low pressure (1 Torr) . The pellet was then supplied to an extruder and extruded into a sheet at 280° C. The sheet-like melted PET was rapidly cooled and thus solidified on a metal roll having a surface temperature of 20° C. Thus, an undrawn sheet having a thickness of 1400 $\mu$m was obtained.

As a filtering member for removing foreign substance particles contained in the melted PET, a stainless steel sintered filtering member allowing particles of 15 $\mu$m or smaller (initial filtering efficiency: 95%) to pass was used.

The undrawn sheet was heated by a group of heated rolls and an infrared heater to 100° C., and then drawn in the longitudinal direction at a draw ratio of 3.5 times by the group of rolls having different circumferential speeds. Thus, a monoaxially oriented PET film was obtained.

The coating liquid was precision-filtered by a felt-type polypropylene filtering member allowing particles of 25 $\mu$m or smaller (initial filtering efficiency: 95%) to pass. The coating liquid was applied to one surface of the monoaxially oriented PET film by reverse rolling. The amount of the coating liquid applied was 0.01 g/m$^2$. The cleanliness in the air (number of particles having a size of 0.5 $\mu$m or more/ft$^3$) from the formation of the undrawn sheet to the application was controlled to be in the class of 100,000 by a hepafilter. After the application, the film was held at an end thereof by a clip and guided to a hot air zone heated to 85° C., where the film was dried for 25 seconds. Then, the film was drawn in the transverse direction at a draw ratio of 4.0 times at 130° C. The film was thermally fixed at 235° C. for 50 seconds, and relaxed at 2.5% in the transverse direction at 225° C. Thus, an optical-use adhesive film having a thickness of 100 $\mu$m was obtained.

Example 2

An optical-use adhesive film having a thickness of 125 $\mu$m was obtained in a similar manner as in Example 1 except that the undrawn sheet was adjusted to have a thickness of 1750 $\mu$m.

Example 3

An optical-use adhesive film having a thickness of 188 $\mu$m was obtained in a similar manner as in Example 1 except that the undrawn sheet had a thickness of 2632 $\mu$m and that the sheet-like melted PET was cooled by a high-speed air flow sprayed against a surface of the sheet opposite to the surface which was in contact with the cooling roll.

Example 4

An optical-use adhesive film having a thickness of 125 $\mu$m was obtained in a similar manner as in Example 2 except that a stainless steel sintered filtering member allowing particles of 10 $\mu$m or smaller (initial filtering efficiency: 95%) to pass was used for removing the foreign substance particles contained in the melted PET.

Example 5

An optical-use adhesive film having a thickness of 188 $\mu$m was obtained in a similar manner as in Example 3 except that a stainless steel sintered filtering member allowing particles of 10 $\mu$m or smaller (initial filtering efficiency: 95%) to pass was used for removing the foreign substance particles contained in the melted PET.

Example 6

An optical-use adhesive film having a thickness of 125 $\mu$m was obtained in a similar manner as in Example 2 except that a felt-type polypropylene filtering member allowing particles of 10 $\mu$m or smaller (initial filtering efficiency: 95%) to pass was used for precision-filtering the coating liquid.

Example 7

An optical-use adhesive film having a thickness of 188 $\mu$m was obtained in a similar manner as in Example 3 except that the cleanliness in the air (number of particles having a size of 0.5 $\mu$m or more/ft$^3$) from the formation of the undrawn sheet to the application was controlled to be in the class of 10,000 by a hepafilter.

Comparative Example 1

A biaxially oriented PET film having a thickness of 125 $\mu$m was obtained in a similar manner as in Example 1 except that the adhesive layer was not formed.

Comparative Example 2

An optical-use adhesive film having a thickness of 125 $\mu$m was obtained in a similar manner as in Example 2 except that the coating liquid was formed in the following manner. First, 33.5 parts of a 30% aqueous dispersion liquid of the polyester copolymer obtained in Example 1, 47.8 parts of water, and 18.7 parts of isopropyl alcohol were mixed. Then, an anion surfactant in an amount of 1% by weight and silica as a slipping agent (Snowtex OL, Nissan Chemical Industries, Ltd.) in an amount of 5% by weight were added.

Comparative Example 3

An optical-use adhesive film having a thickness of 125 $\mu$m was obtained in a similar manner as in Example 2 except that the coating liquid was formed in the following manner. First, 50 parts of a 20% aqueous solution of a self-crosslinking polyurethane aqueous solution containing an isocyanate group blocked with sodium bisulfite (Elastron H-3(trade name), Dai-ichi Kogyo Seiyaku Co., Ltd.), 0.5 parts of a catalyst for Elastron (Cat 64 (trade name), Dai-ichi Kogyo Seiyaku Co. Ltd.), 37.8 parts of water, and 11.7 parts of isopropyl alcohol were mixed. Then, an anion surfactant in an amount 1% by weight and silica as a slipping agent (Snowtex OL, Nissan Chemical Industries) in an amount of 5% by weight were added.

Comparative Example 4

An optical-use adhesive film having a thickness of 125 $\mu$m was obtained in a similar manner as in Example 2 except that a stainless steel sintered filtering member allowing particles of 20 $\mu$m or smaller (initial filtering efficiency: 95%) to pass was used for removing the foreign substance particles contained in the melted PET.

Comparative Example 5

An optical-use adhesive film having a thickness of 125 $\mu$m was obtained in a similar manner as in Example 2 except that a stainless steel sintered filtering member allowing particles of 25 $\mu$m or smaller (initial filtering efficiency: 95%) to pass was used for removing the foreign substance particles contained in the melted PET.

Comparative Example 6

An optical-use adhesive film having a thickness of 125 $\mu$m was obtained in a similar manner as in Example 2 except that, as a polyester polymer, a PET pellet containing 200 ppm of silica having an average particle size of 1.4 $\mu$m and having an intrinsic viscosity of a 0.60 dl/g was used.

Comparative Example 7

An optical-use adhesive film having a thickness of 188 $\mu$m was obtained in a similar manner as in Example 3 except that a stainless steel sintered filtering member allowing particles of 25 $\mu$m or smaller (initial filtering efficiency: 95%) to pass was used for removing the foreign substance particles contained in the melted PET and that the sheet-like melted PET was not cooled by a high-speed air flow sprayed to a surface of the sheet opposite to the surface which was in contact with the cooling roll.

Comparative Example 8

An optical-use adhesive film having a thickness of 188 $\mu$m was obtained in a similar manner as in Example 3 except that a felt-type polypropylene filtering member allowing particles of 50 $\mu$m or smaller (initial filtering efficiency. 95%) to pass was used for removing the aggregations and foreign substance particles contained in the coating liquid and that the sheet-like melted PET was not cooled by a high-speed air flow sprayed to a surface of the sheet opposite to the surface which was in contact with the cooling roll.

Comparative Example 9

An optical-use adhesive film having a thickness of 188 $\mu$m was obtained in a similar manner as in Example 3 except that the sheet-like melted PET was not cooled by a high-speed air flow sprayed to a surface of the sheet opposite to the surface which was in contact with the cooling roll.

Comparative Example 10

An optical-use adhesive film having a thickness of 125 $\mu$m was obtained in a similar manner as in Example 1 except that the draw ratio in the longitudinal direction was 3 times, the draw ratio in the transverse direction was 4.5 times, the thermal fixing was conducted at 190° C., and the relaxing in the transverse direction was conducted at 150° C.

Regarding Examples 1 through 7 and comparative examples 1 through 10, the conditions for formation are shown in Table 1 and the evaluation results are shown in Table 2. In Tables 1 and 2, coating liquid AB refers to a coating liquid containing both a polyester copolymer and a polyurethane resin. Coating liquid A refers to a coating liquid containing a polyester copolymer but not a polyurethane resin. Coating liquid B refers to a coating liquid containing a polyurethane resin but not a polyester copolymer.

TABLE 1

| | Film thickness ($\mu$m) | Coating liquid | Slip-providing particles in substrate film | Maximum particle size allowed to pass through filtering member | | Cooling of undrawn sheet |
| --- | --- | --- | --- | --- | --- | --- |
| | | | | Melted polymer ($\mu$m) | Coating liquid ($\mu$m) | |
| Example 1 | 100 | AB | Non-existent | 15 | 25 | Not cooled |
| Example 2 | 125 | AB | Non-existent | 15 | 25 | Not cooled |
| Example 3 | 188 | AB | Non-existent | 15 | 25 | Cooled |
| Example 4 | 125 | AB | Non-existent | 10 | 25 | Not cooled |
| Example 5 | 188 | AB | Non-existent | 10 | 25 | Cooled |
| Example 6 | 125 | AB | Non-existent | 15 | 10 | Not cooled |
| Example 7 | 125 | AB | Non-existent | 15 | 25 | Not cooled |
| Comparative example 1 | 125 | — | Non-existent | 15 | — | Not cooled |
| Comparative example 2 | 125 | A | Non-existent | 15 | 25 | Not cooled |
| Comparative example 3 | 125 | B | Non-existent | 15 | 25 | Not cooled |
| Comparative example 4 | 125 | AB | Non-existent | 20 | 25 | Not cooled |
| Comparative example 5 | 125 | AB | Non-existent | 25 | 25 | Not cooled |
| Comparative example 6 | 125 | AB | Existent | 15 | 25 | Not cooled |

TABLE 1-continued

|  | Film thickness (μm) | Coating liquid | Slip-providing particles in substrate film | Maximum particle size allowed to pass through filtering member | | Cooling of undrawn sheet |
| --- | --- | --- | --- | --- | --- | --- |
|  |  |  |  | Melted polymer (μm) | Coating liquid (μm) |  |
| Comparative example 7 | 188 | AB | Non-existent | 25 | 25 | Not cooled |
| Comparative example 8 | 188 | AB | Non-existent | 15 | 50 | Not cooled |
| Comparative example 9 | 188 | AB | Non-existent | 15 | 25 | Not cooled |
| Comparative example 10 | 125 | AB | Non-existent | 15 | 25 | Not cooled |

TABLE 2

|  | Adhesiveness To acrylate-based coating layer (%) | Number of optical defects | | | Trans-parency Haze (%) | Thermal shrinkage at 150° C. | |
| --- | --- | --- | --- | --- | --- | --- | --- |
|  |  | Foreign substance particles in substrate film | Foreign substance particles in lens area of substrate film (/m²) | Aggregations and foreign substance particles in adhesive layer |  | Maximum thermal shrinking ratio (%) | Maximum thermal shrinking ratio/minimum thermal shrinking ratio (−) |
| Example 1 | 100 | 4 | 1 | 0 | 0.4 | 0.8 | 1.3 |
| Example 2 | 100 | 6 | 1 | 0 | 0.4 | 0.9 | 1.5 |
| Example 3 | 100 | 9 | 2 | 3 | 0.5 | 1.1 | 2.8 |
| Example 4 | 100 | 3 | 0 | 1 | 0.4 | 0.9 | 1.8 |
| Example 5 | 100 | 3 | 0 | 0 | 0.5 | 1.2 | 2.4 |
| Example 6 | 100 | 6 | 1 | 0 | 0.4 | 0.9 | 1.5 |
| Example 7 | 100 | 6 | 1 | 0 | 0.4 | 0.9 | 1.5 |
| Comparative example 1 | 0 | 4 | 1 | — | 0.3 | 0.8 | 1.3 |
| Comparative example 2 | 53 | 6 | 1 | 0 | 0.4 | 0.9 | 1.6 |
| Comparative example 3 | 82 | 6 | 1 | 0 | 0.4 | 0.9 | 1.5 |
| Comparative example 4 | 100 | 86 | 13 | 0 | 0.5 | 0.9 | 1.4 |
| Comparative example 5 | 100 | 729 | 162 | 1 | 0.4 | 0.9 | 1.5 |
| Comparative example 6 | 100 | 6 | 2 | 0 | 3.5 | 0.9 | 1.5 |
| Comparative example 7 | 100 | 97 | 23 | 0 | 0.9 | 1.1 | 2.8 |
| Comparative example 8 | 100 | 6 | 41 | 53 | 0.9 | 1.1 | 2.4 |
| Comparative example 9 | 100 | 6 | 25 | 0 | 0.4 | 1.1 | 2.6 |
| Comparative example 10 | 100 | 6 | 1 | 0 | 0.4 | 5.6 | 11 |

An can be appreciated from Tables 1 and 2, the present invention provides an optical-use adhesive film which is superior in terms of transparency, adhesiveness against prism lens processing and AR processing, thermal shrinkage and optical defects. Such an optical-use adhesive film can be preferably used for many optical uses.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical-use adhesive film, comprising:
   a substrate film formed of a biaxially oriented polyester film; and
   a polymeric adhesive layer provided on at least one surface of the substrate film,
   wherein the optical-use adhesive film has a haze of 1.0% or less,
   and the substrate film contains foreign substance particles having a maximum size of about 20 μm or more at a density of about 10/m² or less and aggregations and foreign substance particles located at or below a surface of the adhesive layer having a maximum size of about 100 μm or more at a density of about 3/m² or less.

2. An optical-use adhesive film according to claim 1, wherein the substrate film has a thickness of about 100 μm or more.

3. An optical-use adhesive film according to claim 1, wherein the substrate film contains the foreign substance particles having a maximum size of about 20 μm or more at a density of about 10/m² or less in a lens area having a protrusion having a height of about 1 μm or more and a recess bordered on the protrusion and extending a horizontal distance of about 100 μm or less from the border with the protrusion, the recess having a depth of about 0.5 μm or more.

4. An optical-use adhesive film according to claim 1, wherein the polymeric adhesive layer contains a polyester copolymer and a polyurethane resin in a weight ratio of about 90:10 to about 10:90.

5. An optical-use adhesive film according to claim 1, wherein the polymeric adhesive layer contains slip-providing particles, the slip-providing particles having a concentration of about 0.1 to about 60% by weight with respect to the solid amount of the adhesive layer and the slip-providing particles have a diameter in the range of about 0.01 μm to about 1.0 μm.

6. An optical-use adhesive film according to claim 1, having a maximum thermal shrinking ratio of less than or equal to about 3% and maximum thermal shrinking ratio/ minimum thermal shrinking ratio of about 10 after being treated at about 150° C. for about 30 minutes.

* * * * *